(12) United States Patent  
Vanderheyden

(10) Patent No.: US 8,643,977 B1  
(45) Date of Patent: Feb. 4, 2014

(54) TAPE DRIVE FOR RECORDING DATA ONTO AND READING DATA FROM OPPOSING SIDES OF TAPE MEDIA

(71) Applicant: Oracle International Corporation, Redwood City, CA (US)

(72) Inventor: William J. Vanderheyden, Loveland, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/658,002

(22) Filed: Oct. 23, 2012

(51) Int. Cl.  
*G11B 5/008* (2006.01)

(52) U.S. Cl.  
USPC .......................................................... 360/96.1

(58) Field of Classification Search  
USPC ............................... 360/96.1–96.5, 96.51, 85  
See application file for complete search history.

(56) References Cited

U.S. PATENT DOCUMENTS

| | | | | |
|---|---|---|---|---|
| 5,293,285 A | * | 3/1994 | Leonhardt et al. | 360/95 |
| 5,850,328 A | * | 12/1998 | Leonhardt et al. | 360/134 |
| 6,078,481 A | * | 6/2000 | Vanderheyden et al. | 360/132 |
| 8,027,122 B2 | * | 9/2011 | Vanderheyden et al. | 360/93 |
| 2007/0025012 A1 | * | 2/2007 | Sachuk | 360/93 |
| 2007/0230062 A1 | * | 10/2007 | Maejima et al. | 360/316 |
| 2009/0027812 A1 | * | 1/2009 | Noguchi et al. | 360/324.11 |
| 2009/0141393 A1 | * | 6/2009 | Vanderheyden et al. | 360/93 |
| 2010/0149685 A1 | * | 6/2010 | Yari et al. | 360/83 |
| 2012/0262818 A1 | * | 10/2012 | Biskeborn et al. | 360/75 |
| 2012/0320472 A1 | * | 12/2012 | Thompson et al. | 360/132 |

* cited by examiner

*Primary Examiner* — Allen T Cao  
(74) *Attorney, Agent, or Firm* — Marsh Fishcmann & Breyfogle, LLP; Jonathon A. Szumny; Kent A. Lembke

(57) ABSTRACT

A tape drive that passes first and second sides of a storage tape by respective first and second tape head assemblies disposed on a common side of a tape path of the tape to allow for dual-sided recording and/or reading of the tape by the tape head assemblies. Tape leaving a cartridge/supply reel within the tape drive may be wound over one or more tape path guides (e.g., rollers) to face a first side of the tape (e.g., with a first magnetic layer) towards a first tape head assembly. The tape may subsequently be wound over one or more additional guides and then passed in front of a second tape head assembly such that the opposing side of the tape (e.g., with a second magnetic layer) faces the second tape head assembly. After passing by the second tape head assembly, the tape may be wrapped onto a take-up reel.

20 Claims, 5 Drawing Sheets

US 8,643,977 B1

TAPE DRIVE FOR RECORDING DATA ONTO AND READING DATA FROM OPPOSING SIDES OF TAPE MEDIA

BACKGROUND

1. Field of the Invention

The present invention generally relates to data storage devices such as tape drives and, more particularly, to a tape drive that presents both sides of a length of magnetic tape to one or more tape heads or tape head assemblies for recording data onto and/or reading data from both sides of the tape.

2. Relevant Background

Tape drives have been widely employed in industry for over thirty years due to their ability to store large amounts of data on a relatively small and inexpensive removable format. Typically, a removable cartridge holding a reel or spool of storage tape is initially loaded into a tape drive. After coupling the storage tape on the cartridge reel to a take-up reel of the tape drive (e.g., via respective leaders), the tape is unwound from the cartridge supply reel, moved past one or more tape heads (e.g., one or more tape head assemblies) for reading and/or writing of data, and wound onto the take-up reel via a drive motor. Next, the tape is unwound from the take-up reel, moved past the tape heads, and wound onto the cartridge. The storage tape must be uncoupled from the take-up reel prior to removing the cartridge from the tape drive.

Current tape drives write and/or read data from a single side of the tape within a cartridge. More specifically, the take-up reel and various tape path guides (e.g., rollers) in current tape drives pass or otherwise present only one of the opposing surfaces of the tape in front of the one or more tape heads of the tape drives during writing and reading operations. Generally, magnetic tape is made up of a plurality of layers (e.g., films, coatings, and/or the like) of any appropriate materials and thicknesses. While not all layers are necessarily required, magnetic tape typically includes a base substrate with a magnetic layer on one side thereof. In this regard, the side of the substrate having the magnetic layer is the side passed in front of the one or more tape heads during writing and/or reading operations of the tape drive (i.e., the side of the substrate having the magnetic layer faces the tape heads as the magnetic tape passes by the tape heads so that the tape heads can write data to and/or read data from the magnetic layer). Conversely, current tape drives face the other side of the substrate away from the tape heads during tape drive operation (e.g., towards a rotational axis of the supply and take-up reels). In this regard, the opposing sides of the magnetic tape generally maintain a fixed orientation during operation of the tape drive. That is, the side of the substrate over which the magnetic layer is disposed is typically always facing away from the rotational axes of the reels and rollers and towards the tape heads while the side of the substrate over which a magnetic layer is not disposed is typically always facing towards the rotational axes of the reels and rollers and away from the tape heads.

SUMMARY

Increased magnetic tape storage density is an endless goal that pervades magnetic tape design, tape drive design, and the like. For instance, a pair of magnetic layers (each capable of storing data) could be disposed on opposing sides of a magnetic tape substrate to effectively double the storage capacity of the magnetic tape. However, this design has heretofore been impractical due to difficulties with positioning tape heads on both side of the tape within the tape drive (e.g., because of the space required for head actuator mechanisms, flexible cable routing, and the like).

In this regard, disclosed herein is a tape drive that presents both sides of a length of magnetic tape (e.g., magnetic tape stored on a cartridge reel of a cartridge) to one or more tape heads that are disposed on a common side of the tape path of the magnetic tape in the tape drive. Stated differently, the disclosed tape drive sequentially presents one side of the tape to a first tape head assembly (e.g., including one or more tape heads) of the drive and then presents the other side of the tape to a different, second tape head assembly (e.g., including one or more tape heads), where both of the tape head assemblies are disposed on a common side of the tape path within the tape drive (e.g., the outside of the tape path). When used with magnetic tape having respective magnetic layers disposed on opposing sides of the tape, the disclosed tape drive can perform dual-sided recording and reading of the tape. Advantageously, the difficulties associated with positioning tape head assemblies on both sides of the tape path may be avoided or even eliminated. Furthermore, the disclosed tape drive can advantageously be used with and is thus compatible with existing "single-reel" cartridges (i.e., as it is the disclosed tape drive that has been reconfigured in relation to previous tape drives to sequentially present the first and second sides of the tape to respective tape head assemblies, as opposed to the tape cartridge).

For instance, tape coming off of a cartridge reel of a cartridge inserted within the tape drive may be wound through or over one or more tape path guides (e.g., rollers) of the tape drive such that one side of the tape (e.g., with a first magnetic layer) passes in front of and faces a first tape head assembly of the drive (where the first tape head assembly is on one of the inside or outside of the tape path). Subsequently, the tape may be wound over one or more additional guides of the tape drive and then passed in front of a second tape head assembly (located on the inside or outside of the tape path along with the first tape head assembly) such that the opposing side of the tape (e.g., with a second magnetic layer) faces the second tape head assembly of the drive. After passing in front of the second tape head assembly, the tape may be wrapped onto a take-up reel rotatably secured within the tape drive. The dual-sided recording and/or reading may be performed simultaneously and/or sequentially.

Tape exiting the area in front of the first tape head assembly may extend around an outer periphery of the take-up reel before passing by the second tape head assembly. As an example, the tape drive may include, in addition to the guides that respectively present the first and second sides of the tape to the first and second tape head assemblies, one or more additional guides over which the tape may pass that change the course of the tape path and effectively "flip" or change the orientation of the tape before the tape reaches the guides of the second tape head assembly (so that the second side of the tape is presented to the second tape head assembly). For instance, the tape may follow a serpentine course or path as it successively travels from the cartridge reel, to the first tape head assembly guides, to the additional guides, to the second tape head assembly guides, and finally to the take-up reel.

In one embodiment, the tape exiting the area in front of the first tape head assembly may actually pass over and contact or otherwise partially overwrap tape accumulating on the take-up reel that has exited the area in front of the second tape head assembly. This arrangement may advantageously damp lateral tape motion and thereby improve tape path performance in addition to reducing the number of guides needed within the tape drive. As the tape overwrapping the reel is traveling at the same speed as the tape pack beneath it (i.e., the tape exiting the area in front of the second tape head assembly and accumulating on the take-up reel), little or no relative motion between the respective tape portions occurs resulting in little to no wear of the tape. In this regard, the take-up reel may function as one of the "additional" guides that serves to change the orientation of the tape (or as the only orientation changing additional guide).

In one aspect, a tape drive includes a housing at least first and second tape head assemblies secured to the housing on an outside of a tape path for a magnetic tape within the tape drive, a first set of tape path guides secured to the housing and defining a first portion of the tape path for facing a first side of the magnetic tape towards the first tape head assembly and an opposing second side of the magnetic tape towards the first set of tape path guides, a second set of tape path guides secured to the housing and defining a second portion of the tape path for facing the second side of the magnetic tape towards the second tape head assembly and the first side of the magnetic tape towards the second set of tape path guides, and at least one component secured to the housing and defining a third portion of the tape path for facing the second side of the magnetic tape towards the outside of the tape path for entry of the magnetic tape into the second portion of the tape path in a first direction of movement of the magnetic tape along the tape path, and for facing the first side of the magnetic tape towards the outside of the tape path for entry of the magnetic tape into the first portion of the tape path in an opposing second direction of movement of the magnetic tape along the tape path. The first and second tape head assemblies respectively writes and/or reads data to and/or from the first and second sides of the magnetic tape in the first and second portions of the tape path;

In another further aspect, an assembly includes a tape cartridge having a supply reel having a pack of magnetic tape wound thereon, and a tape drive. The tape drive includes at least first and second tape head assemblies, a plurality of tape path guides defining a tape path sequentially passing in front of the first and second tape head assemblies, a take-up reel, and a drive motor interconnected to the take-up reel. Rotation of the take-up reel by the drive motor unwinds the tape from the supply reel of the tape cartridge, moves the tape along the tape path so that first and second opposing sides of the tape respectively face the first and second tape head assemblies, and winds the tape on the take-up reel.

In a further aspect, a method of operating a tape drive includes first moving storage tape of a single-reel tape cartridge along a tape path in front of a first tape head assembly of the tape drive so that a first side of the storage tape faces the first tape head assembly; and second moving, after the first moving, the storage tape along the tape path in front of a second tape head assembly of the tape drive so that an opposed second side of the storage tape faces the second tape head assembly. The first and second tape head assemblies are disposed on a common side of the tape path.

For instance, the method may include first performing writing and/or reading of data to and/or from a first magnetic layer disposed on a first side of a substrate of the storage tape with the first tape head assembly; and second performing (e.g., simultaneously or asynchronously) writing and/or reading of data to and/or from a second magnetic layer disposed on a second side of the substrate of the storage tape with the second tape head assembly. In one arrangement, the method includes first passing the storage tape over a first set of guide rollers so that the second side of the storage tape faces the first set of guide rollers during the first moving; and second passing the storage tape over a second set of guide rollers so that the first side of the storage tape faces the second set of guide rollers during the second moving. For instance, the method may include wrapping the storage tape onto a spool of a take-up reel after the second moving; and/or overwrapping, after the first moving and before the second moving, the storage tape over storage tape that has accumulated on the spool of the take-up reel.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein is a tape drive operable to perform dual-sided recording of tape media such as a length of storage tape. The disclosed tape drive includes an arrangement of reels, tape path guides, and/or the like that is designed to pass both sides of a length of storage tape (e.g., where the tape includes first and second magnetic layers on respective first and second sides of a substrate of the tape) in front of respective tape head assemblies disposed on a common side of the tape path to allow for simultaneous or sequential recording and/or reading of data to or from the first and second magnetic layers of the tape. The disclosed tape drive may be used to perform dual-sided reading/recording of tape stored within single reel tape cartridges.

Figure 1:
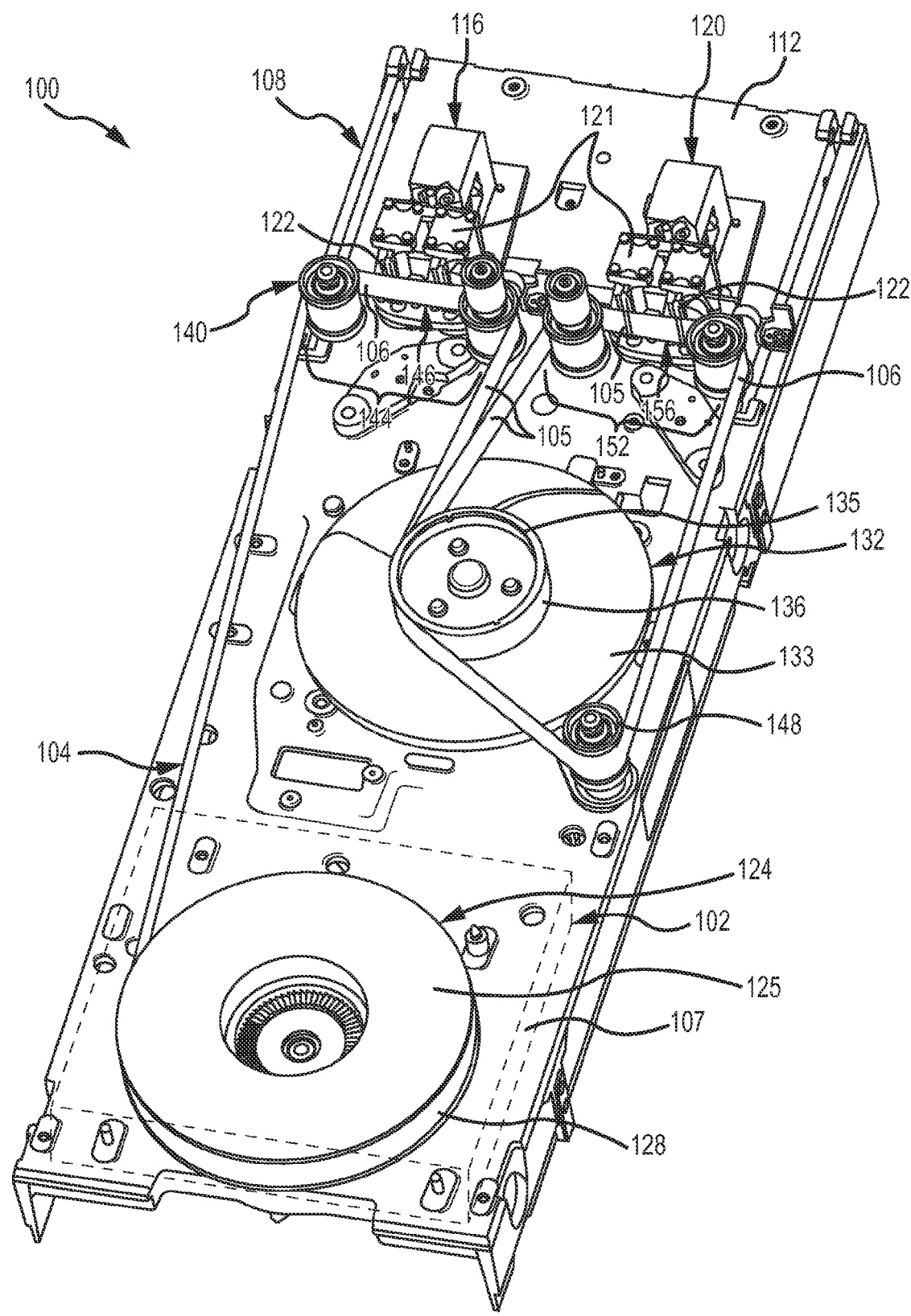
FIG. 1 is a perspective view of a tape drive that is operable to perform dual-sided recording and/or reading of a storage tape, according to one embodiment.
Figure 2:
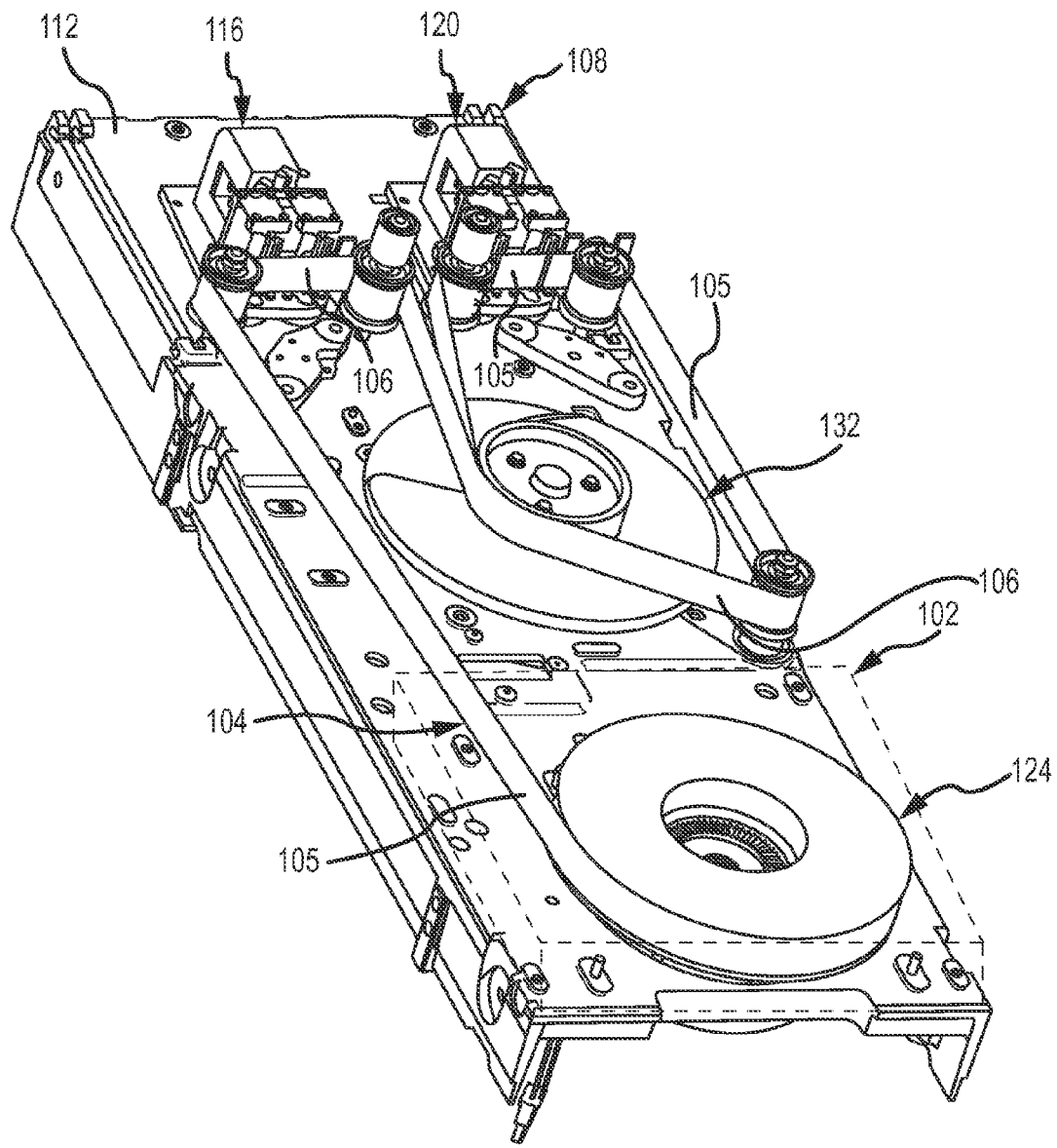
FIG. 2 is another perspective view of the tape drive of FIG. 1.
Figure 3:
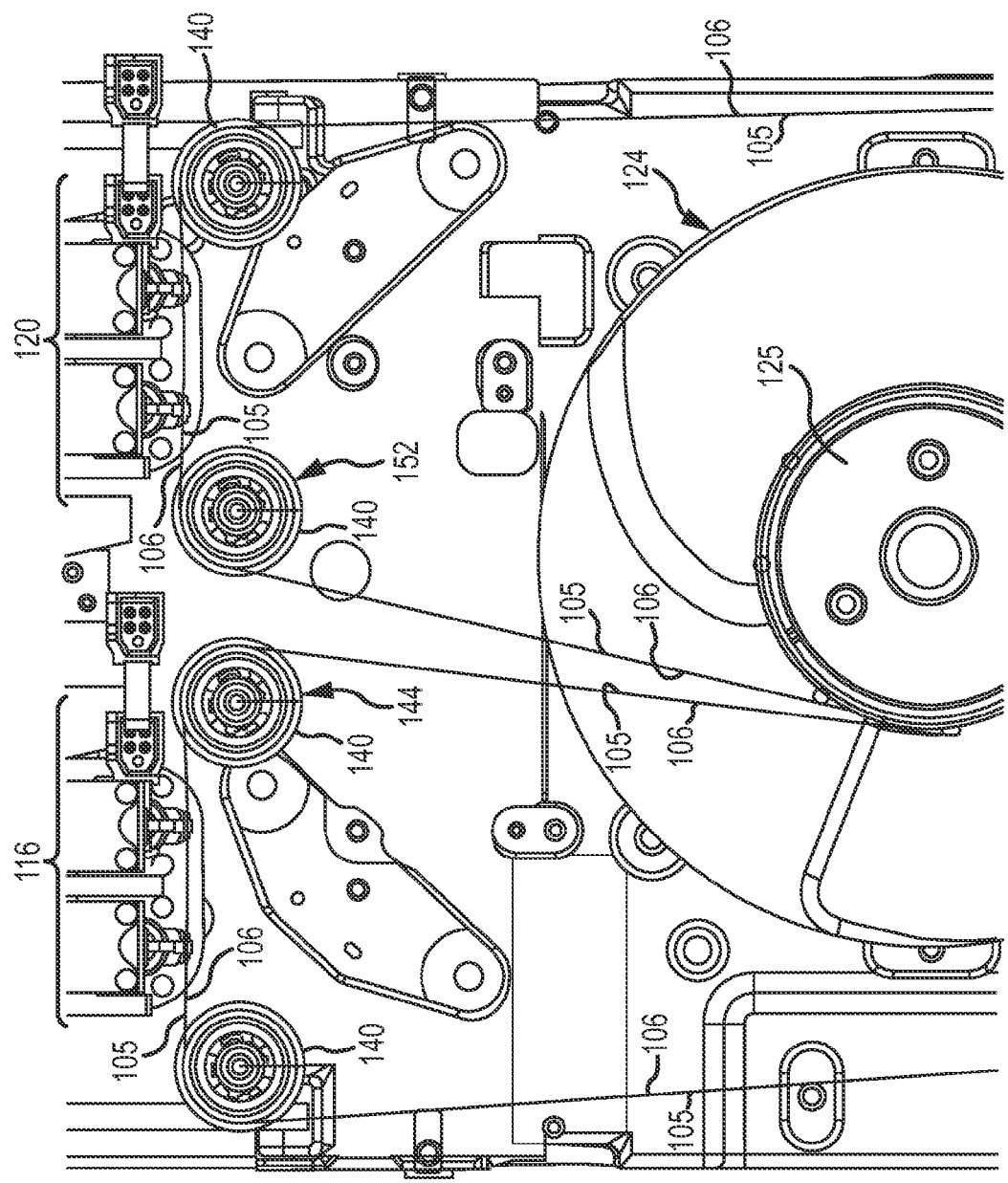
FIG. 3 is a plan view of a portion of the tape drive of FIG. 1.
Figure 4:
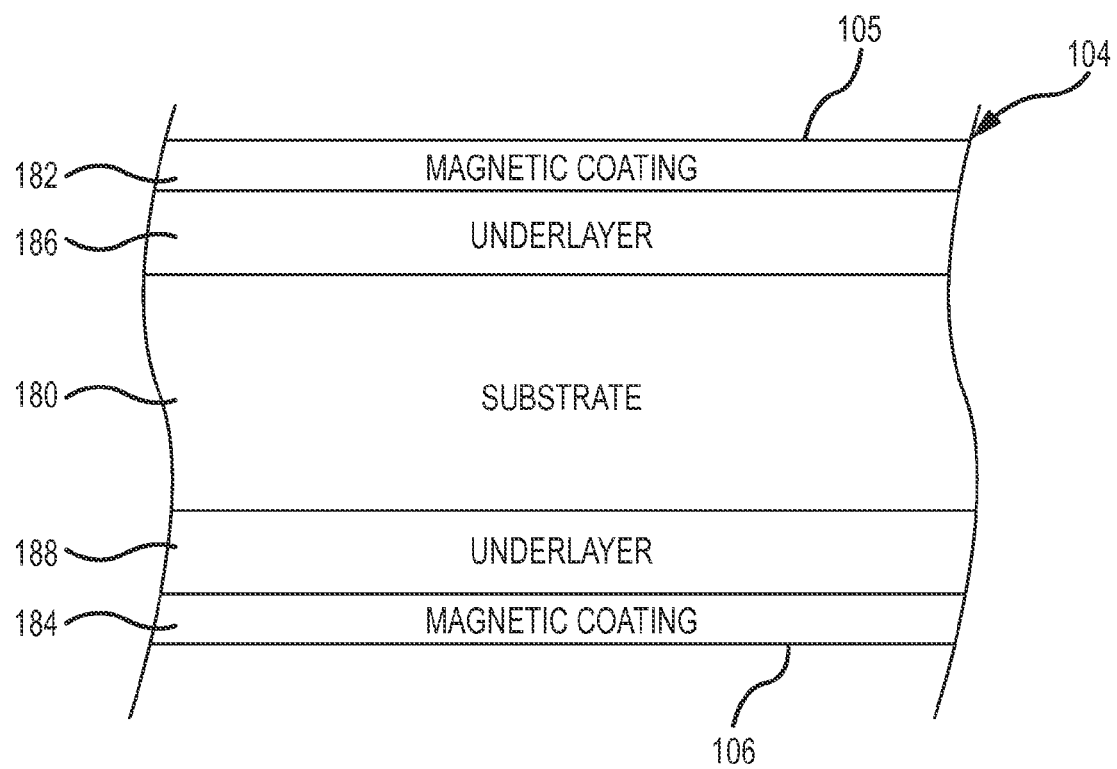
FIG. 4 is a cross-sectional view through the storage tape of FIG. 1.

With initial reference to FIGS. 1-3, various views of an assembly 100 are shown, where the assembly 100 broadly includes a tape drive 108 that is operable to perform dual-sided recording and/or reading of a storage tape 104 (e.g., magnetic tape) disposed within a tape cartridge 102. The tape cartridge 102 may be a "single-reel" tape cartridge generally having a housing 107 and a supply reel 124 rotatably secured within the housing 107. For instance, the supply reel 124 may have a lower flange (not shown), an upper flange 125, and a spool (not shown) for storing an initial or supply pack 128 of the tape 104. Broadly, the tape drive 108 is configured to move the storage tape 104 in first and second opposing directions along a tape path (the tape 104 inherently overlapping the tape path in the figures disclosed herein) to allow at least first and second tape head assemblies 116, 120 of the tape drive 108 to respectively perform writing (e.g., recording) and/or reading operations on or over first and second opposing sides 105, 106 of the storage tape 104 (also see storage tape 104 in FIG. 4 which will be discussed in more detail below). The tape drive 108 includes a housing 112, where the first and second tape head assemblies 116, 120 are appropriately secured to the housing 112 (e.g., both on an inside or outside of the tape path, where the first and second tape head assemblies 116, 120 are illustrated as being on the outside of the tape path). Each of the first and second tape head assemblies 116, 120 includes one or more (e.g., two) tape heads 121, where each tape head 121 includes one or more transducers 122 for writing and/or reading data to and/or from the tape 104.

The tape drive 108 also includes a take-up reel 132 rotatably secured to or within the housing 112 and having a lower flange 133, an upper flange (not shown), and a spool 135 for storing a read or written pack 136 of the tape 104 thereon; drive motors (not shown) for respectively rotatably driving the supply and take-up reels 124, 132 in first and second directions; and a plurality of tape path guides (e.g., rollers) 140 secured to or within the housing 112 that at least partially define the tape path so as to sequentially present the first and second sides 105, 106 of the tape 104 to the first and second tape head assemblies 116, 120, respectively. In operation, the tape cartridge 102 may be appropriately received within a slot or bay (not shown) of the housing 112. Furthermore, the storage tape 104 on the supply reel 124 may be appropriate passed or guided over the various tape path guides 140 along a course as discussed below and coupled to the take-up reel 132 (e.g., via respective leaders). While not shown, the tape drive 108 may include at least one tape drive controller (e.g., in the form of a circuit board including any appropriate arrangement of memory, logic, processors, circuitry, and/or the like) to control operation of the first and second tape head assemblies 116, 120, drive motor, and/or the like (e.g., via receiving and processing signals from a server or the like to read data from and/or write data to the tape 104). It is to be understood that not all components of the tape drive 108 have been necessarily illustrated or described in the interest of clarity.

As mentioned previously, current tape drives present only a single side of the tape to the tape head(s) of the drives which limits the degree to which increased data density on the tape can be achieved. While storage tape can be designed to allow for writing and/or reading operations on both sides of the tape (e.g., by including magnetic coatings on both sides of a substrate of the tape) to effectively increase the data density of the tape, performing writing and/or reading operations on both side has generally been unfeasible with current tape drive technologies due to the need to position tape head assemblies on both sides of the tape path (e.g., one of the outside and one on the inside) for respectively performing writing and/or reading operations on the opposing sides of the tape (e.g., because of the space required for head actuator mechanisms, flexible cable routing, and the like).

In this regard, the present tape drive 108 is configured to sequentially face or otherwise present both sides of magnetic tape of a single-reel tape cartridge to the outside of the tape path so that the first and second tape head assemblies 116, 120 (both of which may be positioned on the outside of the tape path) can respectively perform writing and/or reading operations on the first and second sides 105, 106 of the tape 104. Before discussing how the tape drive 108 presents the first and second sides 105, 106 of the tape 104 to the outside of the tape path (and to the first and second tape head assemblies 116, 120), reference will initially be made to FIG. 4 which illustrates a cross-sectional view through the tape 104 (along a thickness of the tape).

The tape 104 may include a plurality of layers (e.g., films, coatings, and/or the like) of any appropriate materials and thicknesses such as a base substrate 180 (e.g., formed of aramids, Polyethylene Naphthalate (PEN), and/or the like), a first magnetic layer 182 disposed on a first side of the substrate 180 and thus adjacent or near the first side 105 of the tape 104, and a second magnetic layer 184 disposed on an opposing second side of the substrate 180 and thus adjacent to near the second side 106 of the tape 104. The tape 104 may also include one or more additional layers such as base layers (e.g., underlayers), overcoats, backcoats, and/or the like. In one arrangement, the tape 104 may include first and second base layers 186, 188 respectively disposed between each of the first and second magnetic layers 182, 184 and the substrate 180 (e.g., to provide for a smooth surface upon which the magnetic layers may be appropriately formed or coated. It is noted that one or more of the layers may actually be made up of multiple layers of differing materials and that the layers have not necessarily been shown to proper scale.

With reference back to FIGS. 1-3, the various tape path guides 140 secured to the housing 112 of the tape drive 108 sequentially and respectively present the first and second sides 105, 106 of the tape 104 to the first and second tape head assemblies 116, 120. To more fully appreciate the operation of the tape drive 108, reference will also be made to FIG. 5 which illustrates a method 200 of performing dual-sided recording and/or reading of a single-reel tape cartridge, such as of the storage tape 104 via the tape drive 108. At 204, the method 200 may include moving the storage tape 104 along the tape path (e.g., in a first of first and second opposing directions) so that the first side 105 of the tape 104 faces the first tape head assembly 116. For instance, the plurality of tape path guides 140 secured to the housing 112 of the tape drive 108 may include a first set 144 of tape path guides 140 disposed adjacent the first tape head assembly 116 and defining a first portion of the tape path over which the tape 104 travels between the supply reel 124 and take-up reel 132.

As shown, the tape path guides 140 in the first set 144 may be spaced from each other by any appropriate distance to present an appropriately lengthed portion 146 of the tape 104 to the transducer(s) 122 of the first tape head assembly 116. Furthermore, the tape 104 is routed over the first set 144 of tape path guides 140 with the second side 106 of the tape 104 contacting or at least facing the first set 144 of tape path guides 140 and the first side 105 of the tape 104 contacting or at least facing the transducer(s) 122 of the first tape head assembly 116. See FIG. 3. For instance, the first set 144 of tape path guides 140 may be arranged to position the first side 105 of the tape 104 substantially perpendicularly to the transducer(s) 122. The method 200 may then include writing and/or reading 208 data to and/or from the magnetic layer (e.g., first magnetic layer 182, see FIG. 4) on the first side 105 of the tape 104 with the first tape head assembly 116.

Figure 5:
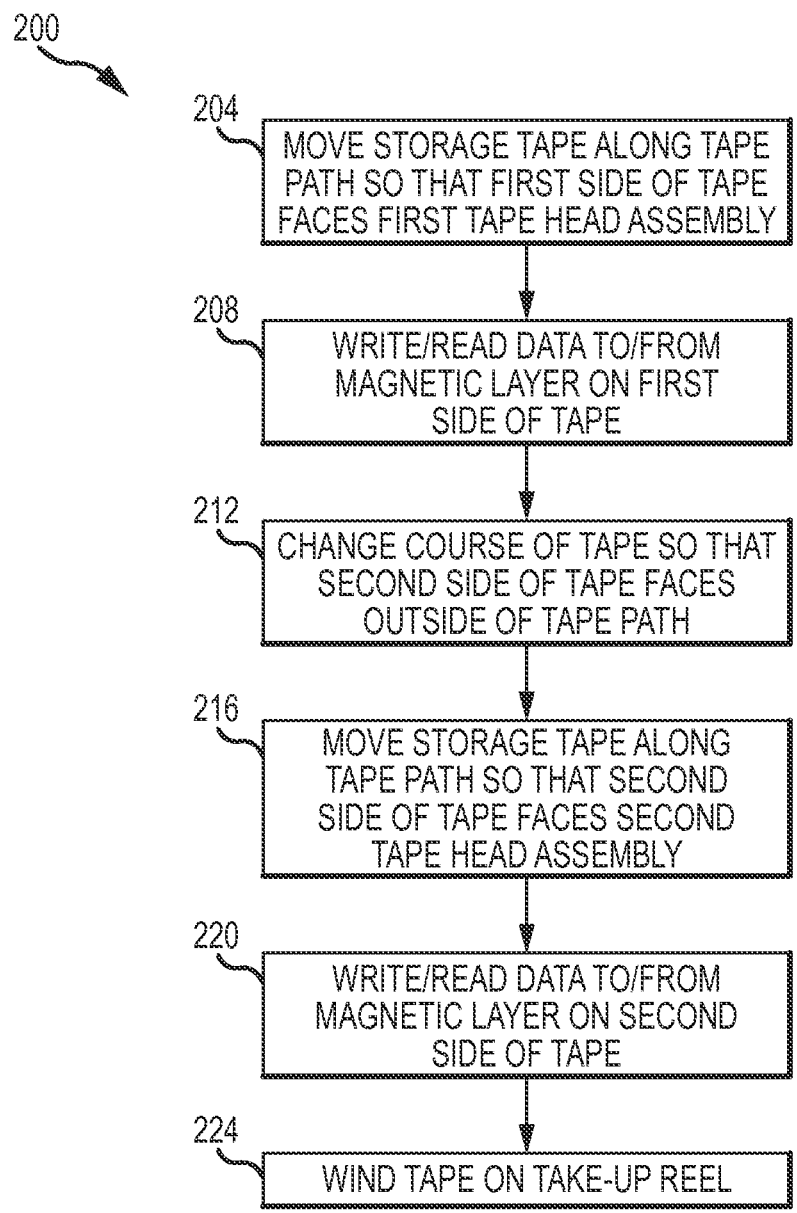
FIG. 5 is a flow diagram illustrating a method of performing dual-sided recording and/or reading of a storage tape, according to one embodiment.

As shown in FIG. 5, the method 200 may then include changing 212 a course of the tape 104 so that the second side 106 of the tape 104 faces the outside of the tape path instead of the first side 105 of the tape 104. In this regard, the tape drive 108 includes one or more "course-changing" components that define another portion of the tape path (e.g., a third portion, where a second set 152 of the plurality of tape path guides 140 disposed adjacent the second tape head assembly 120 define a second portion as discussed below, and where the third portion of the tape path is disposed sequentially between the first and second portions of the tape path) over which the tape 104 passes (e.g., with the first side 105 of the tape 104 contacting such course-changing components) which changes the course of the tape 104 and thus effectively "flips" the tape 104 so that the second side 106 of the tape 104 faces the outside of the tape path instead of the first side 105 of the tape 104 (e.g., at least upon the tape 104 reaching the second tape head assembly 120). See FIGS. 1-3.

Stated differently, during the initial routing or winding of the tape 104, the tape 104 is routed over the first set 144 of tape path guides 140 with the second side 106 of the tape 104 contacting or at least facing the first set 144 of tape path guides 140 and the first side 105 of the tape 104 contacting or at least facing the transducer(s) 122 of the first tape head assembly 116. Subsequently, the tape 104 is routed over at least one course-changing component now with the first side 105 of the tape 104 contacting or at least facing the course-changing component and the second side 106 of the tape 104 facing away from the course-changing component. The course-changing component(s) may also be positioned so as to route the tape 104 around the outside of the spool 135 of the take-up reel 132 (e.g., so as to avoid interference with tape 104 accumulating on the take-up reel 132 after exiting the area in front of the second tape head assembly 120 as discussed below). For instance, the course-changing component(s) may be offset from (e.g., other than collinear with) the first set 144 of tape path guides 140 and/or first tape head assembly 116 in the tape drive 108.

In one arrangement, the tape drive 108 may include at least one course-changing component such as a first course-changing tape path guide 148 over which the first side 105 of the tape 104 passes and faces (with the second side 106 facing away from the guide 148) before the tape 104 moves past the second tape head assembly 120. Upon reaching the second tape head assembly 120, the second side 106 may now be facing towards the outside of the tape path and thus towards the second tape head assembly 120. Alternatively or additionally, the take-up reel 132 may serve as a course-changing tape path guide. For instance, the first side 105 of the tape 104 exiting the area in front of the first tape head assembly 104 may pass over and contact (e.g., partially overwrap) tape 104 that is accumulating on the take-up reel 132 after exiting the area in front of the second tape head assembly 120.

In addition to presenting the second side 106 of the tape 104 to the outside of the tape path, this arrangement may advantageously damp lateral tape motion and thereby improve tape path performance in addition to reducing the number of extra guides 140 needed within the tape drive 108. Furthermore, little or no relative motion between the respective tape portions occurs resulting in little to no wear of the tape as the tape 104 overwrapping the take-up reel 132 is traveling at the same speed as the tape pack 136 beneath it. While the guide 148 and take-up reel 132 have been illustrated as changing the orientation of the tape 104 as discussed above, other arrangements are also envisioned. For instance, the take-up reel 132 may in some arrangements serve as the sole orientation-changing tape path guide (i.e., the guide 148 need not be included). As another example, the guide 148 (and/or other similar guides 148) may be appropriately positioned on the housing 112 so as to change the orientation of the tape 104 (i.e., as the tape 104 exits the areas adjacent the first tape head assembly 116) free of the tape 104 contacting the pack 136 on the take-up reel 132.

In any case, and after the course of the tape 104 has been changed 212 so that the second side 106 of the tape 104 faces the outside of the tape path, the method 200 may include moving 216 the storage tape 104 along the tape path so that the second side 106 of the tape 104 faces the second tape head assembly 120 (which, like the first tape head assembly 116, is located on the outside of the tape path). For instance, the tape 104 may pass over a second set 152 of the plurality of tape path guides 140 disposed adjacent the second tape head assembly 120 that define a second portion of the tape path, where the third portion of the tape path defined by the one or more course-changing components is sequentially disposed between the first and second portions of the tape path respectively defined by the first and second sets 144, 152 of tape path guides 140. In this regard, the third portion of the tape path (that is defined by the one or more course-changing components) effectively flips or reorients the tape 104 in a first direction of movement of the tape 104 so that the second side 106 (instead of the first side 105) faces the outside of the tape path for entry into the second portion of the tape path. Conversely, the third portion of the tape path effectively flips or reorients the tape 104 in an opposed, second direction of movement of the tape 104 so that the first side 105 (instead of the second side 106) faces the outside of the tape path for entry into the first portion of the tape path.

Like the first set 144, the tape path guides 140 in the second set 152 may be spaced from each other by any appropriate distance to present an appropriately lengthed portion 156 of the tape 104 to the transducer(s) 122 of the second tape head assembly 120. Unlike the first set 144, however, the tape 104 is routed over the second set 152 of tape path guides 140 with the first side 105 of the tape 104 contacting or at least facing the second set 152 of tape path guides 140 and the second side 106 of the tape 104 contacting or at least facing the transducer(s) 122 of the second tape head assembly 120. For instance, the second set 152 of tape path guides 140 may be arranged to position the second side 106 of the tape 104 substantially perpendicularly to the transducer(s) 122.

The method 200 may then include writing and/or reading 220 data to and/or from the magnetic layer (e.g., the second magnetic layer 184, see FIG. 4) on the second side 106 of the tape 104 with the second tape head assembly 120, and winding 224 the tape 104 over the spool 135 of the take-up reel 132 (e.g., with the first side 105 facing the spool 135 and the second side 106 facing away from the spool 135, such as towards the first side 105 of the tape 104 exiting the area in front of the first tape head assembly 116). Of course, the drive motor(s) of the tape drive 108 may reverse directions so as to move the tape 104 in a second direction opposed to the first direction. In this case, tape 104 from the pack 136 on the spool 135 of the take-up reel 132 would first travel over the second set 152 of tape path guides (e.g., with the second side 106 facing the second tape head assembly 120), then over the course-changing tape path guide(s), then over the first set 144 of tape path guides 140 (e.g., with the first side 105 facing the first tape head assembly 116), and eventually onto the spool of the supply reel 124 of the tape cartridge 102.

It is noted that the course-changing tape path guide(s) may not actually flip the orientation of the tape 104 after the tape 104 comes off of the second set 152 of tape path guides 140 as the tape 104 is being moved in the second/reverse direction. With reference to FIGS. 1-3, it can be seen that while the course-changing tape path guide(s) flip(s) the orientation of the tape 104 after the tape 104 comes off of the first set 144 of tape path guides 140 with the tape 104 moving in the first/ forward direction (i.e., so that the second side 106 of the tape 104 faces the outside of the tape path), the course-changing tape path guide(s) may not flip(s) the orientation of the tape 104 after the tape 104 comes off of the second set 152 of tape path guides 140 with the tape 104 moving in the second/ reverse direction. In the illustrated embodiment, the tape 104 may not actually re-flip its orientation (i.e., so that the first side 105 faces the outside of the tape path) with the tape moving in the second/reverse orientation until after passing over the take-up reel 132 (e.g., such as about when the tape 104 moves over the first tape path guide 140 of the first set 144 of tape path guides 140). In any event, the tape cartridge 102 may be removed or ejected from the housing 112 of the tape drive 108 once the tape 104 has been at least substantially fully wound onto the spool of the supply reel 124 of the tape cartridge 102.

The disclosed tape drive 108 presents both sides of the tape of a single-reel tape cartridge to the outside of the tape path of the tape to advantageously facilitate dual-sided recording and/or reading of the tape (e.g., when the tape includes recording/magnetic layers on both sides of the tape) free of having to position tape head assemblies on a respective inside and outside of the tape path (and the associated difficulties in doing so, such as limitations associated with the space required for head actuator mechanisms, flexible cable routing, and the like). As it is the tape drive 108 that serves to sequentially present the first and second sides of the tape to respective first and second tape head assemblies of the tape drive (e.g., instead of the tape cartridge within which the tape is wound), little or no modifications to existing (e.g., single-reel) tape cartridges need to be made.

It will be readily appreciated that many additions and/or deviations may be made from the specific embodiments disclosed in the specification without departing from the spirit and scope of the invention. For instance, while the tape drive presented herein has been disclosed in the context of magnetic tape having first and second magnetic layers/coatings on opposing sides thereof, the disclosed tape drive could also be used with other forms of tape media. In one arrangement, the disclosed tape drive could be used to respective present first and second sides of a length of optical tape to respective optical pickup units (OPUs), where the first and second sides have respective encoding or recording layers (e.g., each including a dye recording layer, a phase change material such as AgInSbTe, and/or a semi transparent metal reflecting layer) on which data can be written to and/or read from by the respective OPUs. As another example, the tape drive 108 could include more than first and second tape head assemblies for performing writing and/or reading operations on the first and second sides of the tape 104. For instance, each of the additional tape head assemblies could have respective sets of tape path guides 140 disposed generally adjacent thereto, and one or more course-changing tape path guides may be disposed along the tape path between one or more adjacent sets of tape head assemblies to appropriately "flip" the tape orientation (e.g., so that the second side 106 faces the outside of the tape path instead of the first side 105, or vice versa).

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A tape drive, comprising:
   a housing;
   at least first and second tape head assemblies secured to the housing on an outside of a tape path for a magnetic tape within the tape drive;
   a first set of tape path guides secured to the housing and defining a first portion of the tape path for facing a first side of the magnetic tape towards the first tape head assembly and an opposing second side of the magnetic tape towards the first set of tape path guides, wherein the first tape head assembly writes and/or reads data to and/or from the first side of the magnetic tape in the first portion of the tape path;
   a second set of tape path guides secured to the housing and defining a second portion of the tape path for facing the second side of the magnetic tape towards the second tape head assembly and the first side of the magnetic tape towards the second set of tape path guides, wherein the second tape head assembly writes and/or reads data to and/or from the second side of the magnetic tape in the second portion of the tape path; and
   at least one component secured to the housing and defining a third portion of the tape path for facing the second side of the magnetic tape towards the outside of the tape path for entry of the magnetic tape into the second portion of the tape path in a first direction of movement of the magnetic tape along the tape path, and for facing the first side of the magnetic tape towards the outside of the tape path for entry of the magnetic tape into the first portion of the tape path in an opposing second direction of movement of the magnetic tape along the tape path.

2. The tape drive of claim 1, wherein the third portion of the tape path is sequentially disposed between the first and second portions of the tape path.

3. The tape drive of claim 1, wherein the first and second tape head assemblies and the plurality of tape path guides are disposed on opposing sides of the tape path.

4. The tape drive of claim 1, wherein the at least one component comprises a take-up reel secured within the housing for taking up tape exiting the second portion of the tape path in the first direction of movement of the magnetic tape, wherein magnetic tape exiting the first portion of the tape path in the first direction of movement of the magnetic tape partially overwraps the tape being taken up on the take-up reel after exiting the second portion of the tape path.

5. The tape drive of claim 1, wherein the at least one component comprises an additional tape path guide secured to the housing.

6. The tape drive of claim 5, further comprising:
a take-up reel secured within the housing for taking up tape exiting the second portion of the tape path in the first direction of movement of the magnetic tape.

7. The tape drive of claim 6, wherein the additional tape path guide comprises a first component defining the third portion of the tape path, wherein the take-up reel comprises a second component defining the third portion of the tape path, and wherein magnetic tape exiting the first portion of the tape path in the first direction of movement of the magnetic tape partially overwraps the tape being taken up on the take-up reel after exiting the second portion of the tape path.

8. A method of operating a tape drive, comprising:
first moving storage tape of a single-reel tape cartridge along a tape path in front of a first tape head assembly of the tape drive so that a first side of the storage tape faces the first tape head assembly; and
second moving, after the first moving, the storage tape along the tape path in front of a second tape head assembly of the tape drive so that an opposed second side of the storage tape faces the second tape head assembly, wherein the first and second tape head assemblies are disposed on a common side of the tape path.

9. The method of claim 8, further comprising:
first performing writing and/or reading of data to and/or from a first magnetic layer disposed on a first side of a substrate of the storage tape with the first tape head assembly; and
second performing writing and/or reading of data to and/or from a second magnetic layer disposed on a second side of the substrate of the storage tape with the second tape head assembly.

10. The method of claim 9, wherein the first and second performing occur simultaneously.

11. The method of claim 8, wherein the first side of the storage tape faces an outside of the tape path during the first moving, and wherein the method further comprises before the second moving:
changing a course of the storage tape so that the second side of the storage tape faces the outside of the tape path, wherein the second side of the storage tape faces the outside of the tape path during the second moving.

12. The method of claim 8, further comprising:
first passing the storage tape over a first set of guide rollers secured within a housing of the tape drive so that the second side of the storage tape faces the first set of guide rollers during the first moving; and
second passing the storage tape over a second set of guide rollers secured within the housing of the tape drive so that the first side of the storage tape faces the second set of guide rollers during the second moving.

13. The method of claim 12, wherein the first and second tape head assemblies are disposed on an outside of the tape path, and wherein the first and second sets of guide rollers are disposed on an inside of the tape path.

14. The method of claim 12, further comprising:
wrapping the storage tape onto a spool of a take-up reel that is rotatably secured within the housing of the tape drive after the second moving.

15. The method of claim 14, further comprising:
overwrapping, after the first moving and before the second moving, the storage tape over storage tape that has accumulated on the spool of the take-up reel, wherein the first side of the storage tape faces the spool during the overwrapping.

16. A tape drive for reading data from and/or writing data to opposing first and second sides of a magnetic tape of a single-reel tape cartridge, comprising:
a housing;
a bay within the housing for receiving a single-reel tape cartridge;
at least first and second tape head assemblies secured to the housing on an outside of a tape path for a magnetic tape within the tape drive;
a first set of tape path guides secured to the housing and spaced from the bay, wherein the first set of tape path guides define a first portion of the tape path for facing a first side of the magnetic tape towards the first tape head assembly;
a second set of tape path guides secured to the housing and spaced from the bay, wherein the second set of tape path guides define a second portion of the tape path for facing the second side of the magnetic tape towards the second tape head assembly; and
at least one component secured to the housing and spaced from the bay, wherein the at least one component defines a third portion of the tape path for facing the second side of the magnetic tape towards the outside of the tape path for entry of the magnetic tape into the second portion of the tape path in a first direction of movement of the magnetic tape along the tape path, and for facing the first side of the magnetic tape towards the outside of the tape path for entry of the magnetic tape into the first portion of the tape path in an opposing second direction of movement of the magnetic tape along the tape path.

17. The tape drive of claim 16, wherein the at least one component comprises a take-up reel secured within the housing for taking up tape exiting the second portion of the tape path in the first direction of movement of the magnetic tape, wherein magnetic tape exiting the first portion of the tape path in the first direction of movement of the magnetic tape partially overwraps the tape being taken up on the take-up reel after exiting the second portion of the tape path.

18. The tape drive of claim 16, wherein the at least one component comprises an additional tape path guide secured to the housing.

19. The tape drive of claim 18, further comprising:
a take-up reel secured within the housing for taking up tape exiting the second portion of the tape path in the first direction of movement of the magnetic tape.

20. The tape drive of claim 19, wherein the additional tape path guide comprises a first component defining the third portion of the tape path, wherein the take-up reel comprises a second component defining the third portion of the tape path, and wherein magnetic tape exiting the first portion of the tape path in the first direction of movement of the magnetic tape partially overwraps the tape being taken up on the take-up reel after exiting the second portion of the tape path.

* * * * *

UNITED STATES PATENT AND TRADEMARK OFFICE
CERTIFICATE OF CORRECTION

| | | |
|---|---|---|
| PATENT NO. | : 8,643,977 B1 | Page 1 of 1 |
| APPLICATION NO. | : 13/658002 | |
| DATED | : February 4, 2014 | |
| INVENTOR(S) | : Vanderheyden | |

It is certified that error appears in the above-identified patent and that said Letters Patent is hereby corrected as shown below:

On Title page, column 2, item (74), under Attorney, Agent, or Firm, line 1, delete "Marsh Fishcmann" and insert -- Marsh Fischmann --, therefor.

Signed and Sealed this
Twenty-fourth Day of June, 2014

Michelle K. Lee
*Deputy Director of the United States Patent and Trademark Office*